(12) United States Patent
Brenneis et al.

(10) Patent No.: US 8,216,496 B2
(45) Date of Patent: Jul. 10, 2012

(54) FILTER ELEMENT WITH SEALING AND METHOD OF PRODUCING THE FILTER ELEMENT

(75) Inventors: Fritz Brenneis, Marklkofen (DE); Pius Trautmann, Stuttgart (DE)

(73) Assignee: Mann + Hummel GmbH, Ludwigsburg (DE)

( * ) Notice: Subject to any disclaimer, the term of this patent is extended or adjusted under 35 U.S.C. 154(b) by 906 days.

(21) Appl. No.: 12/178,818

(22) Filed: Jul. 24, 2008

(65) Prior Publication Data

US 2009/0026129 A1  Jan. 29, 2009

(30) Foreign Application Priority Data

Jul. 24, 2007 (DE) .......................... 10 2007 034 907

(51) Int. Cl.
*B29C 41/52* (2006.01)
(52) U.S. Cl. ......... 264/134; 264/251; 264/252; 264/254
(58) Field of Classification Search .................. 264/134, 264/251–252, 254
See application file for complete search history.

(56) References Cited

U.S. PATENT DOCUMENTS

2007/0251872 A1   11/2007   Haes

FOREIGN PATENT DOCUMENTS

| DE | 10163026 A1 | | 7/2003 |
|---|---|---|---|
| GB | 1121896 A | * | 7/1968 |
| GB | 1570385 A | | 7/1980 |
| GB | 2048109 A | * | 12/1980 |
| WO | WO2005/051518 A | | 6/2005 |
| WO | WO2005051518 A | | 6/2005 |
| WO | WO2006/014941 A | | 2/2006 |
| WO | WO2006014941 A | | 2/2006 |

OTHER PUBLICATIONS

EP search report for related application EP 08 161 055.2, 2009.
EPO Search report of EP08161055, 2009.

* cited by examiner

*Primary Examiner* — Christina Johnson
*Assistant Examiner* — Xue Liu

(57) ABSTRACT

A filter element has a fold arrangement and a shaped seal extending about at least one section of a circumference of the fold arrangement. The shaped seal consists of a thixotropic sealing material or at least contains such a thixotropic sealing material. The thixotropic sealing material is thixotropic PUR or thixotropic silicone or a mixture of both.

6 Claims, 1 Drawing Sheet

FILTER ELEMENT WITH SEALING AND METHOD OF PRODUCING THE FILTER ELEMENT

BACKGROUND OF THE INVENTION

The invention relates to a filter element that is provided with a seal extending about its circumference as well as a method for producing such a filter element.

A filter element serves in general for filtration of, for example, fluid flows or gaseous media such as air flows that, for example, are supplied to the passenger compartment (interior) of a motor vehicle. Aside from their use in motor vehicles, such filters can also be used in other fields, for example, in air-conditioning devices and venting systems of buildings or for filtering liquid media.

The efficiency of a filter depends in particular on the size of the surface area of the filter through which the air passes. In the case of interior air filters of motor vehicles, zigzag-folded (or accordion-folded) filters are therefore primarily used. By means of such a fold arrangement, as a function of the fold height and the fold spacing of the various fold sections of the filter, an effective enlargement of the filter surface area through which the air flow passes can be achieved.

A filter element that is used e.g. as an interior air filter of a motor vehicle, serves for filtering by means of a suitable filter the ambient air that is supplied to the interior of the motor vehicle after having been conditioned. For this purpose, for example, particle filters or odor-removing filters or combinations of such filters are employed that remove by filtration the contained particles and inherent odors from the ambient air. In interior air filters of motor vehicles there is the problem that the filter element must be installed in a corresponding receiving space in such a way that it rests seal-tightly therein and that no gap between filter element and receiving space is formed that would cause leakage.

Filter elements, for example, interior filters, are known in the prior art wherein the filter element is sealed off by a hard or flexible textile lateral strip. Such a lateral strip serves at the same time as a seal relative to the receiving space.

Such filter elements however have the disadvantage that the lateral strips are only insufficiently effective as a seal and frequently hit their limitations. Moreover, the sealing contour of such a textile lateral strip cannot be varied easily.

DE 101 63 026 discloses a filter element comprising a seal that projects past a face of a flat filter. The seal is configured as an unshaped sealing bead made form a thixotropic reaction mixture.

There is therefore a need to provide a filter element with a seal that rests with satisfactory seal tightness against a receptacle in such a way that no leaks can occur.

In addition there is a need that such a filter element with a seal can be produced in a simple and inexpensive way.

Advantageously, the seal should be attachable to a side of the filter element.

The seal should be advantageously configured such that it can be shaped, i.e., non-round shapes should be possible, e.g. one or several projecting sealing strips or lateral beads.

In view of these demands, the present invention has the object to provide a filter element with an improved seal which filter element moreover should be predicable inexpensively.

SUMMARY OF THE INVENTION

According to the present invention, this object is solved by a filter element that is provided on at least one section of its circumference with a seal wherein the seal consists of a thixotropic sealing material or at least comprises a thixotropic material.

The object is furthermore solved in connection with the method for producing such a filter element with a seal by the following steps: metering a thixotropic sealing material into a mold cavity of a molding tool; pressing the mold cavity with the thixotropic sealing material contained therein against at least one section of the circumference of the fold arrangement of the filter element; and removing the molding tool with the mold cavity after the sealing material has formed a seal with the desired shape on the filter element.

The object is furthermore solved in connection with the method for producing such a filter element with a seal by the following steps: applying a thixotropic sealing material onto at least one section of the circumference of the fold arrangement of the filter element; placing a molding tool with a mold cavity onto the thixotropic sealing material; mechanically loading said sealing material of said seal by said molding tool to unsolidify said sealing material so it may flow; flowing a portion of said sealing material into said mold cavity; shaping the sealing material by means of the mold cavity so that a seal with the desired shape is formed on the filter element; solidifying said shaped seal by polymerization of said sealing material, said polymerization occurring when said sealing material is no longer mechanically loaded; and subsequently removing the molding tool with the mold cavity.

The principle upon which the present invention is based resides in that a filter element is provided with a seal that enables an improved sealing action of the filter element in a filter receiving space (receptacle). For this purpose, a seal made from a thixotropic sealing material is applied to at least one section of the circumference of the fold arrangement (folded filter material) of the filter element.

In this way it is possible to provide a filter element that has improved lateral sealing action in a filter receiving space in comparison to textile lateral strips as they are employed currently. Moreover, such a filter element with such a seal can be produced easily and comparatively inexpensively. This is so because the thixotropic sealing material can be processed in a particularly simple and easy way. A further advantage is that such a seal can be produced or foamed with any desired contour.

Advantageous embodiments and further developments of the invention can be taken from the dependent claims as well as the description in connection with attached drawings.

In an advantageous embodiment, the thixotropic sealing material of the seal of the filter element is, for example, thixotropic PUR and/or thixotropic silicone. The thixotropic PUR has the advantage that it forms a substantially closed surface into which bacteria cannot easily penetrate in comparison to the known textile lateral strips. In principle, it also conceivable to employ a sealing material that behaves similar to the thixotropic sealing materials. This means that these sealing materials when applied to the filter element do not run down and, moreover, can be easily formed to the desired shape.

Advantageously, the seal is shaped, i.e., it deviates from a round sealing bead. In this way, the adaptation to different receptacles and sealing geometries within a housing can be realized. The seal can be designed, for example, as a profiled section provided with one for several rectangular or semicircular projections. In different embodiments, the seal can act in the inserted state alternatively in a radial or axial direction or can act both radially as well as axially.

In one embodiment, in addition to its function of providing a sealing action fir the filter element within the housing, the seal can close off simultaneously the folds at the end faces, or parts of the end faces of the fold arrangement, where the folds are open.

In a further embodiment the seal is provided with at least one additional sealing element, for example, a sealing lip. This has the advantage that the sealing action of the filter element is further improved. Moreover, in contrast to known textile strips, a thixotropic seal can be very easily provided with additional sealing elements or foamed so as to have additional sealing elements. The sealing elements or the contour of the seal can be varied as desired without any problems.

In another advantageous embodiment the filter element has a zigzag-folded (or accordion-folded) and/or undulated fold arrangement. This has the advantage that filter elements with any fold arrangement can be utilized without any limitation and can be provided with a seal made from a thixotropic sealing material.

In a further advantageous embodiment, the filter element has a partially circumferentially extending or completely circumferentially extending seal. This has the advantage that a filter element, depending on function and purpose, can be provided with a circumferential seal or can be provided only partially with a seal.

In another advantageous embodiment, the folds of the filter element are at least partially or completely closed off by the seal. By complete closure of the folds, an optimal sealing action can be achieved by means of the filter element because there are no gaps through which a medium to be filtered could pass without having been filtered.

In another advantageous embodiment the seal is attached by means of an adhesive to the filter element. For this purpose, for example a hot melt adhesive or any other suitable adhesive can be used. This has the advantage that the seal, for example, in the form of an endless strip, can be produced beforehand and subsequently can be glued to the circumferential sides or faces of the filter element in question.

According to another advantageous embodiment the thixotropic sealing material is applied onto the filter element by means of a molding tool provided with a corresponding mold cavity. This has the advantage that the seal is formed directly on the filter element.

In another advantageous embodiment, the filter element is an odor-removing filter and/or a particle filter or a liquid filter. This has the advantage that the filter element provided with a seal of a thixotropic sealing material can be used for a variety of applications and is not limited to air filters but can be in principle used for all other types of filters.

DESCRIPTION OF THE PREFERRED EMBODIMENTS

Figure 1:
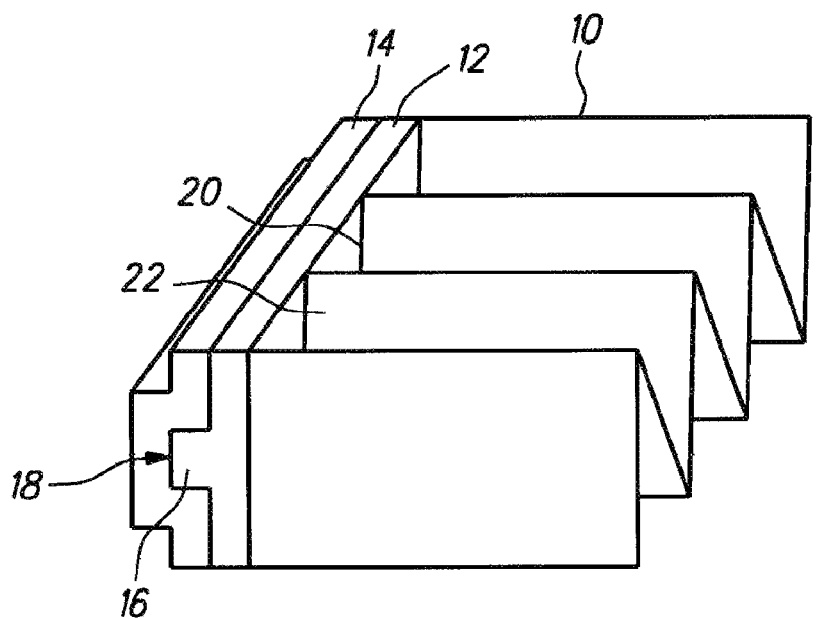
FIG. 1 is a schematic perspective view of a filter element whose seal is shaped by means of a molding tool with a mold cavity.

In the drawings, components, elements and features that are the same, or functionally identical, are identified by same reference numerals, if not noted otherwise.

FIG. 1 shows a schematic perspective illustration of a filter element 10 according to the invention comprised of a fold arrangement of filter material with a seal 12. The seal 12 is comprised of a thixotropic sealing material 24, for example, thixotropic PUR (thixotropic polyurethane) or thixotropic silicone. This list is to be understood to be exemplary only and is non-limiting. Basically, for the seal 12 of the filter element 10 any type of suitable thixotropic sealing material 24 can be used or a sealing material that behaves similar to or substantially in the same way as a thixotropic sealing material.

In order to shape the seal 12 form the thixotropic sealing material 24, a molding tool (not illustrated) with a mold cavity 14 is used, for example. The mold cavity 14 forms the desired contour of the seal 12 and is removed after the shaping process is completed. The finished filter element 10 with seal 12 can subsequently be used, for example, in the form of an air filter or odor-removing filter and/or particle filter. Basically, any other type of filter element can be provided with the afore described seal. For example, a liquid filter is conceivable also as a filter element 10.

The thixotropic sealing material, for example, thixotropic PUR has the advantage that, as soon as it has been applied to the filter element 10, it solidifies to such an extent that it can be shaped by the molding tool with the mold cavity 14 without the sealing material running down the filter element 10. In contrast, a non-thixotropic PUR is relatively liquid so that after having been applied to the filter element 10 it will run down. Moreover, polymerization of the thixotropic PUR occurs relatively quickly so that the shaping process by means of the molding tool can be completed rather quickly and the molding tool can then be subsequently removed. Non-thixotropic PUR requires in contrast thereto in a shaping process several minutes in order to solidify to a satisfactory degree. A further advantage of thixotropic PUR is that it forms a substantially closed surface in which bubbles are connected with one another. In this way, bacteria cannot penetrate and settle in the PUR. In case of textile lateral strips, bacteria can however easily penetrate into the fabric.

The term thixotropy refers to the property of a non-Newton fluid in which the viscosity decreases at constant shear strain across a time axis X. After cancelling the shear strain, the initial viscosity will return. Modern strong and enduring sealing materials are examples of thixotropically reacting products. They can be easily spread and exhibit in this connection also the required flow behavior, but they essentially solidify immediately when they are no longer mechanically loaded.

Figure 2:
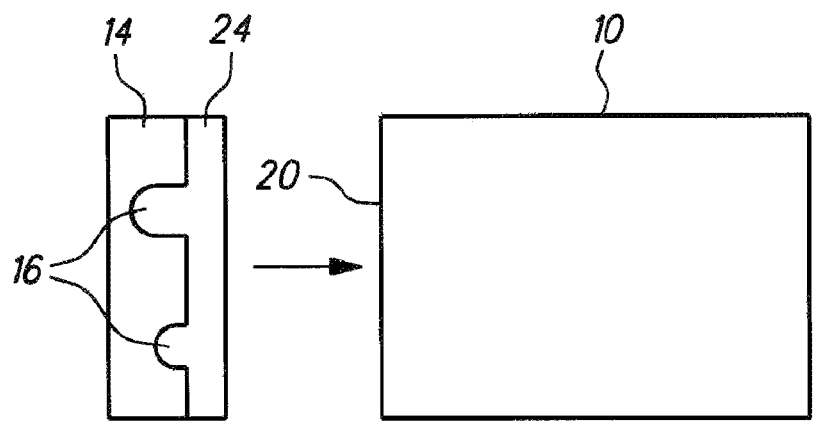
FIG. 2 is a side view of the filter element according to FIG. 1 wherein the sealing material is filled into the mold cavity of the molding tool.
Figure 3:
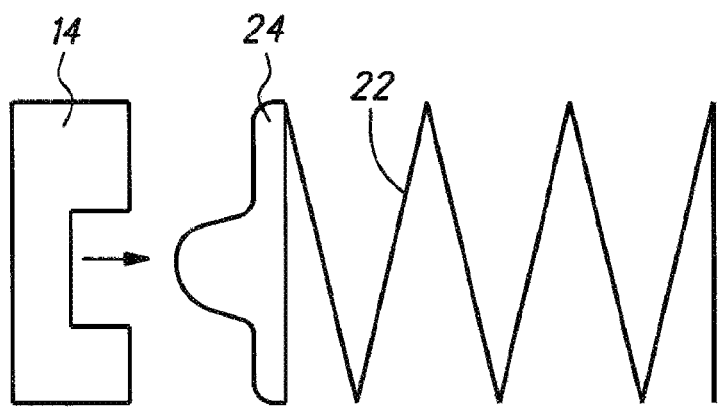
FIG. 3 is a side view of the filter element according to FIG. 1 wherein the sealing material is applied to the fold arrangement of the filter element and subsequently a mold cavity of a molding tool is placed onto the sealing material.

The sealing strip or the seal 12, as illustrated in the FIGS. 1 to 3, is provided with a sealing lip 16 as an additional sealing element 18. This has the advantage that a lateral sealing action can be improved even more. Basically, the sealing strip 12 can have any suitable contour or, as needed, can be provided with at least one additional sealing element 18 such as a sealing lip 16 or can be foamed so as to have such a sealing element 18.

Basically, the filter element 10, respectively, the fold arrangement of filter material, can be provided circumferentially or at least across one or several sections with the afore described seal 12, depending on which area of the filter element 10 is to be configured to provide a sealing action.

The seal 12 can be premanufactured as an endless strip wherein, as needed, additional sealing elements 18, for example, one or several sealing lips 16, can be provided. The endless strip can be, for example, attached by means of an adhesive to a corresponding filter element 10 (not illustrated). This has the advantage that a continuous manufacture that does not required a casting mold is possible wherein the filter elements 10 can be cut to the required length and then be provided with the sealing strip 12. This corresponds to the manufacture used in regard to textile lateral strips. However, the use of seals 12 made form a thixotropic sealing material 24 has the advantage that the lateral sealing action of the filter elements 10 can be significantly improved relative to the use of textile lateral strips. As needed, additional sealing elements 18 can be foamed; this further improves the sealing action.

A further possibility for producing a filter element 10 according to the invention with a seal 12 will be explained in relation to FIG. 2. In this connection, for example, a thixotropic PUR is metered into a circumferential mold cavity 14 of a molding tool. Further sealing elements 18, for example, two rounded sealing lips 16 can be integrated in the mold cavity 14. The still liquid thixotropic PUR is pressed against the fold arrangement 20 of the filter element 10 wherein the sealing material 24 can be used at the same time for laterally closing the folds 22 of the filter element 10. The folds 22 are at least partially, or completely, closed off by the sealing material 24. This holds true for all embodiments.

Moreover, the inventive filter element can be produced with a seal as illustrated in FIG. 3. The sealing material 24 is a thixotropic PUR that is applied to the side of the filter element 10. Subsequently, the molding tool with a correspondingly shaped mold cavity 14 is placed onto the thixotropic PUR and the thixotropic PUR is shaped by means of the contour of the mold cavity 14. The thixotropic PUR has the advantage relative to non-thixotropic PUR that it can be applied without problems to the filter element 10 and that it solidifies quickly without running down the filter element 10. In contrast, a non-thixotropic PUR behaves in such a way that it will run down the filter element 10 after having been applied to the filter element 10 because in the beginning it is rather liquid and requires several minutes in order to solidify to a satisfactory degree so that it can be shaped.

Even though the present invention has been explained supra in detail with the aid of preferred embodiments, the invention is not limited to these embodiments and can be modified in many ways.

The present invention is in particular not limited to the above explained configurations of the described embodiments and variants. In particular, the present invention is not limited to thixotropic PUR and thixotropic silicone as sealing material 24. In principle, any other thixotropic sealing material 24 can be used or a sealing material that behaves in a similar way as a thixotropic material.

Moreover, the invention is not limited to the mold cavities 14 shown in FIGS. 1 to 3. Instead of having one or two sealing lips 16, the seal 12 can also be provided with several sealing lips 16 that have the same shape or different shapes. Basically, the contour of the seal 12, as well as the shape and number of additional sealing elements 18, such as sealing lips 16, can be varied depending on the application and function of the seal.

Moreover, the invention is not limited to filter elements 10 for filtering gaseous media but can also be used advantageously for filter elements 10 for filtering liquids. Also, the invention is not limited necessarily to filter elements 10, for example, for air-conditioning devices and the like in the automotive field, but can also be used in an advantageous manner in any application in which filter elements 10 are employed.

Moreover, the fold arrangement 22 of the filter element 10 must not be zigzag-folded or accordion-folded but can also be undulated.

Furthermore, in the afore described embodiments, the sealing material 24 can be applied circumferentially or partially circumferentially or across sections on the sides or faces of the filter element 10. The seal 12, as shown in FIGS. 1 to 3, can be flush with the filter element 10 but can also slightly project past at least one side of the filter element 10 (not illustrated).

Furthermore, the filter element 10 must not have a quadrangular shape and a zigzag-folded arrangement of folds as shown in FIG. 1 but can have any type of shape or fold arrangement. The filter element 10, in addition to a quadrangular shape, can also have any other polygonal shape or can be round or oval and can be a combination of polygonal and round contours. The outer contour of the filter element 10, as described above, is provided with a seal 12 of a thixotropic sealing material 24.

Moreover, the invention is not limited to the afore described manufacturing processes. The methods are to be understood only as exemplary and preferred embodiments, wherein modifications are possible.

While specific embodiments of the invention have been shown and described in detail to illustrate the inventive principles, it will be understood that the invention may be embodied otherwise without departing from such principles.

What is claimed is:

1. A method for producing a filter element comprising the steps of:
    providing a fold arrangement of folded filter material;
    providing a mold tool having a mold cavity, said mold cavity shaped to form a seal of a desired shape;
    applying a thixotropic sealing material to at least one section of circumferential end faces of said fold arrangement, laterally closing off circumferential end faces of the folds of said fold arrangement where said folds are otherwise open;
    solidifying said sealing material in a first shape on said at least one section said solidifying to an extent that said sealing material can be molded by said mold tool;
    placing said mold cavity of said molding tool onto said thixotropic sealing material;
    shaping said sealing material by said mold cavity into a second shape different from said first shape so that a seal of a desired shape is formed on said circumferential end faces of said fold arrangement, wherein said second shape includes at least one sealing lip protruding laterally outwardly from said sealing material closing off said circumferential end faces;
    removing said mold cavity from said shaped seal.

2. The method according to claim 1, wherein said thixotropic sealing material is selected from the group consisting of thixotropic PUR and thixotropic silicone.

3. The method according to claim 1, wherein
    in said providing a mold tool step, said mold cavity is shaped to form at least one sealing lip; and
    in said shaping step, said seal of said desired shape includes said at least one sealing lip, said at least one sealing lip projecting outwardly from other portions of said seal and said fold arrangement.

4. The method according to claim 1, wherein
    in said providing a mold tool step, said mold cavity is shaped to form at least one rectangular or semi-circular seal projection; and
    in said shaping step, said seal of said desired shape includes said at least one at least one rectangular or semi-circular seal projection, said at least one seal projection projecting outwardly from other portions of said seal and said fold arrangement.

5. The method according to claim 1, wherein
    in said providing a fold arrangement step, said fold arrangement has zigzag-shaped folds or undulated folds or zigzag-shaped and undulated folds.

6. The method according to claim 1, wherein
    said shaped seal extends about a portion of a circumference of said fold arrangement.

* * * * *